United States Patent Office 3,728,323
Patented Apr. 17, 1973

3,728,323
PROCESS FOR THE POLYMERIZATION OF CONJUGATED DIENES
Tai Chun Cheng, Mogadore, and Adel F. Halasa, Bath, Ohio, assignors to The Firestone Tire & Rubber Company, Akron, Ohio
No Drawing. Continuation-in-part of application Ser. No. 854,289, Aug. 29, 1969. This application Sept. 7, 1971, Ser. No. 178,489
Int. Cl. C08d 3/04, 3/06, 1/32
U.S. Cl. 260—94.2 T         15 Claims

ABSTRACT OF THE DISCLOSURE

Conjugated dienes are polymerized by a new catalyst system which permits control of the molecular weight and gives a more easily processed product. This catalyst system comprises (1) a potassium hydrocarbon compound having 1–10 carbon atoms in which the hydrocarbon portion is a primary, secondary or tertiary alkyl or an aryl radical, and (2) a potassium alkoxide of 4–10 carbon atoms, preferably a tertiary-alkoxide. The diene polymers produced by this process have controllable molecular weights in the range of 25,000 to 1,000,000 preferably 100,000 to 500,000, broad molecular weight distribution, glass transition temperatures higher than normally obtained, high degree of branching and are more easily processed in the production of rubber and other compositions for commercial use.

---

This application is a continuation-in-part of copending application Ser. No. 854,289, filed Aug. 29, 1969, now abandoned.

BACKGROUND OF THE INVENTION

Field of the invention

This invention relates to a process for the polymerization of dienes using a catalyst composition comprising a potassium hydrocarbon compound and a potassium alkoxide.

Related prior art

The polymerization of conjugated dienes can be effected in a variety of methods. However, there are various disadvantages in the various methods presently known including undesirable or uncontrollable properties in the products,, such as lack of control of molecular weight, molecular weight distribution and processability of the polymers. For example, the so-called "Alfin" catalyst system which has been studied extensively produces poly-butadienes of approximately 5,000,000 molecular weight, or even higher, which are difficult to process for commercial use. This catalyst system generally comprises allyl sodium, sodium isopropoxide and sodium chloride. There are a number of literature references describing the Alfin process, typical of which is the review article in Rubber Age, vol. 94, October 1963, pp. 87–92.

This Alfin catalyst system effects very rapid formation of a very high molecular weight polymer having molecular weights of about 5,000 with about 75% of the polymer in the trans-1,4 configuration. In contrast, polymerization by al alkyl sodium, such as amyl sodium, produces a much slower polymerization reaction to give a polymer having as high as 70% in the 1,2 configuration but with a molecular weight too low for the desired properties.

Polybutadienes prepared by the use of n-butyl lithium in n-hexane have about 8–10% 1,2, 53–54% trans-1,4 and 35–37% cis-1,4 configurations, which polymers do not have enough 1,2 configuration for the desired properties. By using polar modifiers or solvents, such as ethers, amines, etc., the vinyl content can be increased up to 50–70%. However, the molecular weight distribution in such cases is so narrow as to give poor processability. Moreover, the polar modifiers act as chain terminators and prevent active polymer products that might be coupled or otherwise post-treated to improve processability. Processability is very important for commercial rubber tire production. Among other disadvantages poor processability results in poor adhesion to fillers and thereby gives poor reinforcement.

High glass transition temperature in butadiene polymers generally indicate and accompany good wet traction. Butadiene emulsion polymers have low glass transition temperatures and have poor wet traction when fabricated into tires.

SUMMARY OF THE INVENTION

In accordance with the present invention, it has now been found that conjugated diene polymers of controllable molecular weight, broad molecular weight distribution, good processability, high glass transition temperatures and good wet traction are produced by the use of a catalyst system comprising the combination of (1) a potassium alkyl, or aryl, and (2) a potassium alkoxide. A third component, namely a potassium halide, can be present in the catalyst system depending on the method used in preparing the potassium alkyl or aryl.

The hydrocarbon portion of the potassium hydrocarbon component has 1–10 carbon atoms, and even though larger groups can be used, there is no particular advantage. The hydrocarbon portion is alkyl or aryl, including alkaryl or aralkyl, and the potassium can be attached to a primary, secondary or tertiary carbon atom.

These cn be prepared by the reaction of metallic potassium with the corresponding halohydrocarbon. In cases where it is desired to prepare the potassium hydrocarbon free of the byproduct potassium halide, this can be done by preparing it in a liquid which is a solvent for the potassium hydrocarbon, but not for the potassium halide, such as diethyl ether, tetrahydrofuran, or other ether. Then after the salt has been separated from the solution by decantation or filtration, a higher boiling hydrocarbon is added and the ether removed by distillation, using reduced pressure to keep the temperature low.

A preferred method for preparing the potassium alkyl free of halide is to add a solution of a potassium alkoxide, such as KOt-Am in cyclohexane, to a hexane solution of halide-free alkyl lithium. The K alkyl precipitates and after filtering the solid K alkyl is washed under nitrogen with hexane to remove any lithium residues.

In the potassium alkoxide the hydrocarbon portion advantageously has 4–10 carbon atoms. While even larger groups can be used, there is no added advantage, and the resultant compounds are more sluggish in their activity.

The potassium alkoxide is prepared by the reaction of metallic potassium with an alcohol, preferably a tertiary alcohol. This is advantageously prepared separtely and excess potassium is used to insure that no unreacted alcohol remains to react with the potassium hydrocarbon upon mixture of the potassium alkoxide therewith. Some potassium alkoxides, such as t-butoxide, are available commercially.

In this catalyst combination, the system is most active when there is one mole of the potassium alkoxide per mole of the potassium hydrocarbon. If there is less than a 0.18–1 ratio, the catalyst is unsuitable, and if there is a considerable excess of the alkoxide over a 2.5–1 mole ratio, the catalyst is much less effective compared with the 1–1 optimum ratio. However, as the ratio decreases or increases from this optimum amount, there is some activity since there will be at least a portion of the potassium hydrocarbon associated with 1 mole of the alkoxide. Consequently, it is desirable to keep within the range of 0.18–

2.5 moles of potassium alkoxide per mole of potassium hydrocarbon, preferably approximately a 1–1 mole ratio.

If a potassium halide is present, it is generally in the amount deposited by the reaction of potassium with the halohydrocarbon by which the potassium hydrocarbon may be formed, so that generally there is a mole of potassium halide per mole of potassium hydrocarbon. The halide is generally the chloride or bromide, since these are more economical than the fluoride and iodide.

The catalyst can be prepared at room temperature, but preferably at 0° C. or even lower.

The effectiveness of the tertiary alkoxide as an active component in the present catalyst system is surprising, particularly in view of the teaching against the use of tertiary alkoxides in the Alfin catalyst system as reported in the last paragraph on page 637 of Robert W. Lenz's book on "Organic Chemistry of Synthetic High Polymers," Interscience Publishers, New York (1969), where it is stated, in a discussion of Alfin catalyst systems, "Inactive catalyst are formed with alkoxides of n-propanol, t-pentanol, allyl alcohol and other non-secondary alcohols, . . ." (Underscoring added.)

Typical potassium hydrocarbon compounds that can be used include compounds in which the hydrocarbon portion is methyl, ethyl, n-propyl, isopropyl, n-butyl, sec.-butyl, t-butyl, n-amyl, sec.-amyl, t-amyl, n-hexyl, sec.-hexyl, t-hexyl, n-octyl, 1,1,5-trimethyl-pentyl, n-decyl, 1-methyl - 2,4 - diethyl-pentyl, phenyl, tolyl, ethylphenyl, naphthyl, methylnaphthyl, benzyl, phenethyl, etc.

Typical potassium alkoxides that are suitable include those in which the hydrocarbon portions are t-butyl, t-amyl (or 1,1-dimethyl-propyl), 1,1,4-trimethylpentyl, 1-methyl - 1,4 - diethyl - pentyl, cumyl, 1-methyl-1-phenyl propyl isopropyl, n-butyl, sec.-butyl, n-amyl, sec.-amyl, sec.-heptyl, n-hexyl, sec.-hexyl, n-octyl, n-decyl, etc.

The catalyst is used in a proportion of 0.1 to 2.67 millimoles per 100 grams of monomer. The polymerization temperature is advantageously no higher than 40° C. and is preferably no higher than 70° C. While higher temperatures can be used, even as high as 125° C., the percent vinyl or 1,2 microstructure in the polymer decreases when the temperature exceeds 70° C.

Polybutadienes produced at temperatures of 125° C. or lower have molecular weights as high as 1,000,000, generally 100,000 to 500,000. Yields as high as 98–99% are easily produced. The 1,2 configuration in the polymer is at least 35% and generally in the range of 35 to 50% when a temperature no higher than 70° C. is maintained. It has been found that desirable wet traction of skid resistance properties require at least 35% 1,2 configuration in the polymers. In contrast corresponding emulsion polymers, which have low glass transition temperature (−55 to −59° C.), also have poor wet traction properties. These polymers have 20–25% 1,2 configuration and 75–80% trans-1,4.

The polymerization is advantageously effected in the presence of an inert diluent to facilitate handling of the polymer and to give better temperature control. Normally liquid hydrocarbons are preferred for this purpose, such as benzene, toluene, saturated aliphatic hydrocarbons preferably of the straigh chain variety, such as n-hexane, n-heptane, etc. However, where provision is made for external heat dissipation and temperature control the solvent can be omitted.

The polymerization is advantageously conducted in a pressure vessel to avoid loss of monomer and solvent, particularly if temperatures are to be used at or above the boiling point of either. Advantageously the polymerization temperature is no higher than 125° C., preferably no higher than 70° C., since higher temperatures give progressively lower vinyl content with increase in temperature.

Conjugated dienes that may be polymerized in accordance with this invention include: 1,3-butadiene, isoprene, chloroprene, 2-phenyl-1,3-butadiene, piperylene, etc.

Although butadiene homopolymers are preferred in the practice of this invention, butadiene copolymers can also be used where the comonomers impart desirable properties and do not detract from the polymer properties. The comonomers are preferably olefins, such as butene-1 n-butene-2, isobutylene, n-pentene-1, n-pentene-2, and the like, and also including vinyl aryl or isopropenyl aryl compounds or derivatives thereof having alkyl, aralkyl, cycloalkyl or chlorine attached to the aromatic nucleus, and preferably having no more than 20 carbon atoms. Typical of these aromatic comonomers are styrene, alpha-methyl styrene, vinyl toluene, isopropenyl toluene, ethyl styrene, p-cyclohexyl styrene, o-, m- and p-Cl-styrene, vinyl naphthalene, vinyl methyl naphthalene, vinyl butyl naphthalene, vinyl cyclohexyl naphthalene, isopropenyl naphthalene, isopropenyl isopropyl naphthalene, 1-vinyl-4-chloronaphthalene, 1 - isopropenyl-5-chloronaphthalene, vinyl diphenyl, vinyl diphenylethyl, 4-vinyl-4'-methyl-diphenyl, 4-vinyl-4'-chlorodiphenyl, and the like. Preferably such comonomers have no more than 12 carbon atoms. Where such comonomers are to be used, generally at least 1%, preferably at least 5% by weight should be used and such as much as 60%, preferably no more than 30% may be used.

In referring above to millimoles of catalyst this corresponds to the millimoles of potassium hydrocarbon since the catalyst is regarded or at least calculated as a complex of the potassium alkoxide and the potassium hydrocarbon.

The "dilute solution viscosity" (DSV) referred to herein is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration. The molecular weights reported herein are based on the dilute solution viscosity.

SPECIFIC EMBODIMENTS OF INVENTION

The invention is illustrated by the following examples which are intended merely for purpose of illustration and are not to be regarded as limiting the scope of the invention or the manner in which it may be practiced. Unless specifically indicated otherwise, parts and percentages are given by weight.

Example I

To a 3-necked flask which is equipped with a high speed air stirrer, a nitrogen gas inlet, a Dry Ice reflux condenser and an external bath (maintained at −10° C.), there is added 1200 ml. of dry hexane and then 121.2 ml. of a 30% dispersion of potassium in mineral oil (containing 31.3 gm. of metallic potassium). This slurry is cooled to −10° C. and 42 ml. of dry n-butyl chloride is added slowly with high speed agitation. After the addition of the n-butyl chloride, the reaction mixture is stirred continuously for about 60 minutes. At the end of this time, 44.8 gm. of potassium t-butoxide is added. The resultant mixture is stirred for an additional 30 minutes at −10° C. then the temperature is raised gradually to room temperature and the slurry is transferred to a bottle in which a nitrogen atmosphere is maintained while the mixture is allowed to age for 1–2 weeks.

Example II

By reversing the order of addition of the reagents in Example I it is possible to avoid the aging period required in Example I, and thus permit the use of the catalyst system immediately upon preparation. To a 3-necked flask which is equipped with a high speed air stirrer, a nitrogen gas inlet, a Dry Ice reflux condenser and an external bath, there is added 1200 ml. of dry hexane and then 121.2 ml. of a 30% dispersion of potassium in mineral oil (containing 31.3 g. of metallic potassium). At this time 44.8 g. of potassium t-butoxide is added at once with high speed agitation at room temperature for one hour. At the end of this time, this slurry is cooled to −10° to −15° C. and 42 ml. of n-butyl chloride in 50 ml. of hexane is added dropwise. During the course of the reaction positive nitrogen gas pressure is maintained. The resultant mixture is stirred for an additional 30 minutes at −10° C. Then the temperature is raised gradually to room temperature and the slurry is transferred to a bottle in which a nitrogen atmosphere is maintained. The catalyst is then ready for use without any aging. The potassium t-butoxide can also be formed in situ by using an appropriate larger amount of potassium metal and adding the t-butanol before the n-butyl chloride is added.

Example III

To a moisture-free reactor which has been flushed with dry nitrogen, there is added 1,584 grams of a hexane solution containing 365.9 grams of butadiene. The solution is stirred for about 10 minutes at 30° C. and 5.592 millimoles of catalyst prepared as described in Example I or Example II is added with a hypodermic syringe under 50 lbs. of nitrogen pressure at 30° C. The system is immediately closed and the reactor rotated in a polymerization bath maintained at 30° C. After about 4 hours, a reddish polymer is obtained. This is collected by pouring the mixture into a larger amount of methanol and 20 ml. of an antioxidant, such as p-phenylenediamine. The polymer is dried and a polymer yield of 365.3 grams or approximately 100% of theoretical is obtained. The molecular weight of the polymer is approximately 500,000.

Example IV

The procedure of Example III is repeated a number of times using in one case an Alfin catalyst prepared according to the procedure described by Hensley and Greenberg in Rubber Journal, 146, 42 (1964), and in other cases the procedure of Example III is repeated identically, in one case using the same temperature, namey 30° C., and in other cases using temperatures of 50°, 70° and 100° C. respectively. Other conditions and results are tabulated below in Table I. As will be noted, the molecular weight of the Alfin-catalyzed polymer, as indicated by the high dilute solution viscosity (DSV), is much higher than for the polymer produced with the catalyst system of this invention. It will also be noted that ,whereas the Alfin catalyst produces a polymer having a 20% 1,2 configuration, the polymers produced by the catalyst system of this invention. It will also be noted that, whereas the figuration. It will also be noted that the 100° C. temperature causes a reduction in the 1,2 content of the polymer, and, therefore, it is generally desirable to use a lower temperature when a high 1,2 microstructure is desired.

polymer are better than the corresponding characteristics of the compared commercial type. When the respective polymers are blended respectively in a standard oil recipe and tested with standard laboratory traction devices, the new polymer of this invention registered about 21% improvement over the commercial type on the medium and high coefficient of friction surfaces. The composition with the new polymer has a faster cure rate, which results in a slightly higher modulus and tensile strength and a lower running temperature than the commercial type. The recipe used for the testing composition is: 100 (parts) polymer; 70 ISAF Black; 43 oil; 2.5 ZnO; 2.0 stearic acid; 1.0 Santoflex 13; 1.7 sulfur; 1.4 Cyclix B. This is cured for 30 minutes at 300° F. and gives the following test results:

|  | Commercial type | New polymer |
|---|---|---|
| Stanley-London wet skid resistance index: |  |  |
| Surface CF 0.09 | 100 | 100 |
| Surface CF 0.39 | 91 | 117 |
| Surface CF 0.54 | 89 | 112 |
| Young's bending modulus (cured 30 minutes at 300° F.)—Index: At 10,000 p.s.i., ° C. | −71 | −61 |

Example VI

The procedures of Examples I–III are repeated with similar results using equivalent amounts of other potassium alkyls or aryls as prepared from the following hydrocarbon halides:

(a) n-Butyl bromide
(b) t-Amyl fluoride
(c) 2-chloro-n-pentane
(d) 2-iodo-n-hexane
(e) 2-chloro-2,5-dimethylhexane
(f) Cumyl chloride
(g) 2-bromo-2-phenylethane
(h) Alpha-chloronaphthalene
(i) Chlorobenzene
(j) Beta-chloro-alpha-methylnaphthalene

Example VII

The procedures of Examples I–III are repeated with similar results using in place of the potassium t-butoxide equivalent weights respectively of:

(a) Potassium t-amyloxide
(b) Potassium 2-oxy-2,5-dimethylhexane
(c) Potassium cumyloxide

Example VIII

The procedures of Examples I–III are repeated a number of times using in place of the butadiene an equivalent weight respectively of:

TABLE I

| Catalyst | Temp., ° C. | Mmoles cat./60g. monomer | DSV | Percent gel | I.R. Cis-1,4, percent | I.R. Trans-1,4, percent | I.R. 1,2 percent |
|---|---|---|---|---|---|---|---|
| Alfin | 30 | 1.8 | 13.5 | 0 | 10 | 70 | 20 |
| nBuK-KOtBu | 30 | 0.4 | 2.16 | 0.64 | 10 | 36.3 | 53.7 |
| nBuK-KOtBu | 50 | 0.4 | 1.80 | 0 | 14.4 | 42.8 | 42.8 |
| nBuK-KOtBu | 70 | 0.4 | 2.38 | 0 | 14.2 | 48.6 | 37.2 |
| nBuK-KOtBu | 100 | 0.4 | 2.32 | 0 | 12.7 | 52.2 | 35.1 |

Example V

Comparative tests are made on a polybutadiene prepared according to Example III and a butyl lithium-catalyzed polybutadiene of a type being used commercially for tire production. The polymer produced according to this invention shows a bulk viscosity almost three times as high as the commercial type butyl lithium-catalyzed polybutadiene. However the new polymer shows only slightly higher inherent viscosity measurements than for the commercial type. This information together with the respective molecular weight distribution determinations shows that the polymers of this invention are highly branched. Moreover, the overall processability characteristics of this (a) Isoprene
(b) Chloroprene
(c) Piperylene
(d) 2-phenyl-1,3-butadiene
(e) 75–25 mixture of butadiene and styrene
(f) 70–30 mixture of butadiene and vinyl toluene
(g) 80–20 mixture of butadiene and n-butene-1
(h) 70–30 mixture of butadiene and isoprene
(i) 75–25 mixture of isoprene and n-hexane-1.

Example IX

The procedures of Examples I–III are repeated with similar results using in place of the hexane an equivalent amount respectively of: benzene, toluene, n-octane, cyclohexane and methylcyclohexane.

Example X

The procedures of Examples I and II are repeated using an equal amount of dry diethyl ether in place of the n-hexane. After the final stirring is completed and the solution allowed to come to room temperature, the precipitated potassium chloride is removed from the ether solution by filtration. Then 800 ml. of dry benzene is added and the ether removed by gradual and careful application of reduced pressure. The ether is recovered in a Dry Ice trap. When the initial amount of ether has been recovered, the distillation is stopped. The resultant catalyst suspensions are used with similar results in the procedures of Examples III, VI, VII and VIII.

Example XI

The procedure of Example I is repeated except that the slurry product is shaken twice with an equal volume of diethyl ether to extract the potassium n-butyl and the potassium t-butoxide. The potassium chloride remains insoluble and is allowed to settle, and the solution is decanted therefrom and filtered if necessary. Then the ether solution is placed in a reduced pressure system with 800 ml. of dry benzene and the pressure gradually reduced to vaporize the ether which is collected in a Dry Ice trap. When the original amount of ether is collected the distillation is stopped and the benzene slurry of catalyst is used with similar results in the procedures of Examples III, VI, VII and VIII.

Example XII

A catalyst system free of halide is prepared as follows: To 600 ml. of a hexane solution containing 1 mole of halide-free n-BuLi there is added with stirring ad under a nitrogen atmosphere 600 ml. of a cyclohexane solution containing 1 mole of K t-amyloxide. The n-BuK precipitate is filtered and washed under nitrogen several times with cyclohexane. This material upon analysis shows less than 1.44% Li being present.

A number of 28 oz. polymerization bottles are charged, after being flushed with nitrogen, with 60 gm. of butadiene in 260 gm. of hexane solution. The bottles are sealed with caps having an opening covered by a rubber liner covered on the inside with aluminum foil, and the bottle and its contents brought to a temperature of 30° C. Using the halide-free n-BuK prepared as described above, the respective catalyst combinations described below are injected as a hexane solution by a hypodermic syringe inserted through the rubber liner in the sealing cap of the bottle. The bottles are placed in a polymerization bath maintained at 30° C. and rotated for 4 hours. (The specified metal alkoxides are available halide-free commercially or may be prepared by the addition of the stoichiometric amount of the appropriate alcohol to a mineral oil suspension of the finely divided metal.)

A corresponding number of polymerization bottles are charged with the same amounts of materials and subjected to identical conditions except in this series the catalyst system is prepared as in Example II so that KCl is present in the system.

In each case approximately 100% conversion is obtained and the results are tabulated in Table II.

TABLE II

| n-BuK, mmoles/ 60 g. monomer salt-free | n-BuK, mmoles/ 60 g. monomer with salt | KOtBu, mmoles/ 60 g. monomer | KOtAm, mmoles/ 60 g. monomer | Percent 1,2 | $T_g$, °C. | Mol weight |
|---|---|---|---|---|---|---|
| 1.6 | | 3.3 | | 53.5 | −62 | 52,000 |
| | 1.6 | 3.3 | | 53.1 | −60 | 50,000 |
| 1.2 | | | 2.4 | 54.4 | −64 | 53,000 |
| | 1.2 | | 2.4 | 49.1 | −65 | 54,000 |

Example XIII

The procedure of Example XII is repeated for the preparation of salt-free n-amyl K, using n-amyl Li in place of n-butyl Li, and the subsequent polymerizations are performed with K isopropoxide and K n-butoxide with approximately 100% conversions.

Corresponding polymerizations are run with 100% conversions using substantially the same amounts and subjected to identical conditions except that the n-amyl K is prepared as in Example II so that KCl is present in the system.

The results are tabulated below in Table III.

TABLE III

| Millimoles per 60 g. of monomer | | | | Mol weight |
|---|---|---|---|---|
| n-AmK salt-free | n-AmK with salt | K Isopropoxide | K n-Butoxide | |
| 1.37 | | 0.5 | | 290,000 |
| | 1.40 | 0.5 | | 214,000 |
| 2.0 | | 0.5 | | 280,000 |
| | 2.0 | 0.5 | | 147,000 |
| 2.6 | | 0.5 | | 200,000 |
| | 2.7 | 0.5 | | 125,000 |
| 1.37 | | | 0.5 | 450,000 |
| | 1.4 | | 0.5 | 441,000 |
| 2.0 | | | 0.5 | 280,000 |
| | 2.0 | | 0.5 | 248,000 |
| 2.6 | | | 0.5 | 230,000 |
| | 2.7 | | 0.5 | 170,000 |

Example XIV

The procedure of Example XIII is repeated using in place of the butadiene a mixture of 75% butadiene and 25% styrene with approximately 100% conversion and results as tabulated below in Table IV.

TABLE IV

| Millimoles per 60 g. of monomer | | | | Mol weight |
|---|---|---|---|---|
| n-AmK salt-free | n-AmK with salt | K Isopropoxide | K n-Butoxide | |
| 1.37 | | 0.5 | | 460,000 |
| | 1.40 | 0.5 | | 469,000 |
| 2.0 | | 0.5 | | 250,000 |
| | 2.0 | 0.5 | | 214,000 |
| 2.6 | | 0.5 | | 200,000 |
| | 2.7 | 0.5 | | 148,000 |
| 1.37 | | | 0.5 | 440,000 |
| | 1.40 | | 0.5 | 345,000 |
| 2.0 | | | 0.5 | 260,000 |
| | 2.0 | | 0.5 | 194,000 |
| 2.6 | | | 0.5 | 200,000 |
| | 2.7 | | 0.5 | 144,000 |

Example XV

The procedure of Example XII is repeated using Na t-amyloxide instead of K t-amyloxide to prepare salt-free Na n-butyl and using NaOtBu and NaOtAm respectively in place of the corresponding K alkoxides. In the subsequent polymerizations using the same concentrations and conditions as in Example XII conversions of about 20% and molecular weights of less than 10,000 are obtained showing that a catalyst system having Na in place of K in both catalyst components is very ineffective.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A process for the hydrocarbon solution polymerization of a monomer composition containing at least 70 percent conjugated diene to produce a polymer having at least 35% of the diene in the 1,2-configuration and the remainder being predominantly of the trans-1,4 configuration and a molecular weight of about 25,000 to 500,000 comprising the steps of maintaining said monomer composition at a temperature of no more than 100° C.

in intimate contact with a catalyst composition consisting essentially of:
(a) A potassium hydrocarbon having 1–10 carbon atoms therein selected from the class consisting of potassium alkyls and potassium aryls; and
(b) A potassium tertiary-alkoxide of no more than 10 carbon atoms, the concentration of said catalyst composition being 0.1–2.67 millimoles of catalyst per 100 grams of said monomer composition, and said potassium alkoxide being present in said catalyst composition in a ratio of 0.18–2.5 moles per mole of potassium hydrocarbon, said polymerization being conducted for a period of at least one hour.

2. The process of claim 1 in which said temperature is no more than 70° C.

3. The process of claim 2 in which said conjugated diene is 1,3-butadiene.

4. The process of claim 2 in which said monomer composition is essentially all 1,3-butadiene.

5. The process of claim 4 in which said potassium hydrocarbon is potassium n-butyl.

6. The process of claim 4 in which said polymerization is conducted for at least ten hours.

7. The process of claim 4 in which said potassium alkoxide is potassium tertiary-butoxide.

8. The process of claim 7 in which said potassium hydrocarbon is potassium n-butyl.

9. The process of claim 8 in which said ratio of potassium alkoxide to potassium hydrocarbon is approximately two.

10. The process of claim 9 in which said polymerization is conducted in n-hexane solution.

11. The process of claim 10 in which said monomer is in n-hexane solution at a concentration of 10–25 percent by weight.

12. The process of claim 1 in which said catalyst composition is present at a concentration of 0.3–1.0 millimoles per 100 grams of said monomer.

13. The process of claim 1 in which said monomer composition is dissolved in a liquid hydrocarbon having a boiling point no higher than 110° C.

14. The process of claim 13 in which said monomer composition is present at a concentration of 10–25 percent by weight.

15. The process of claim 14 in which said liquid hydrocarbon is n-hexane.

References Cited

UNITED STATES PATENTS

| | | | |
|---|---|---|---|
| 3,265,680 | 9/1966 | Forman et al. | 260—94.2 |
| 3,265,758 | 8/1966 | Hedman et al. | 260—94.2 X |
| 3,294,768 | 12/1966 | Wofford | 260—83.7 |
| 3,324,191 | 6/1967 | Wofford | 260—669 |
| 3,331,821 | 7/1967 | Strobel | 260—83.7 |
| 3,331,826 | 7/1967 | Talcott | 260—94.2 |
| 3,380,984 | 4/1968 | Birchell et al. | 260—94.2 |

FOREIGN PATENTS

| | | | |
|---|---|---|---|
| 782,970 | 1956 | Great Britain | 260—94.2 |

OTHER REFERENCES

Alfin Catalyst by Morton, Encyclopedia of Polymer Science and Technology (1964), vol. I, pp. 629–638.

JAMES A. SEIDLECK, Primary Examiner

W. F. HAMROCK, Assistant Examiner

U.S. Cl. X.R.

260—83.7, 85.3; 252—431 R